June 7, 1949.   F. P. WEISS   2,472,134
DIRECT CURRENT APPARATUS
Filed Aug. 24, 1946   8 Sheets-Sheet 1

INVENTOR.
Francis P Weiss,
BY

June 7, 1949.  F. P. WEISS  2,472,134
DIRECT CURRENT APPARATUS
Filed Aug. 24, 1946  8 Sheets-Sheet 2

INVENTOR.
Francis P. Weiss,
BY

June 7, 1949.  F. P. WEISS  2,472,134
DIRECT CURRENT APPARATUS
Filed Aug. 24, 1946  8 Sheets-Sheet 3
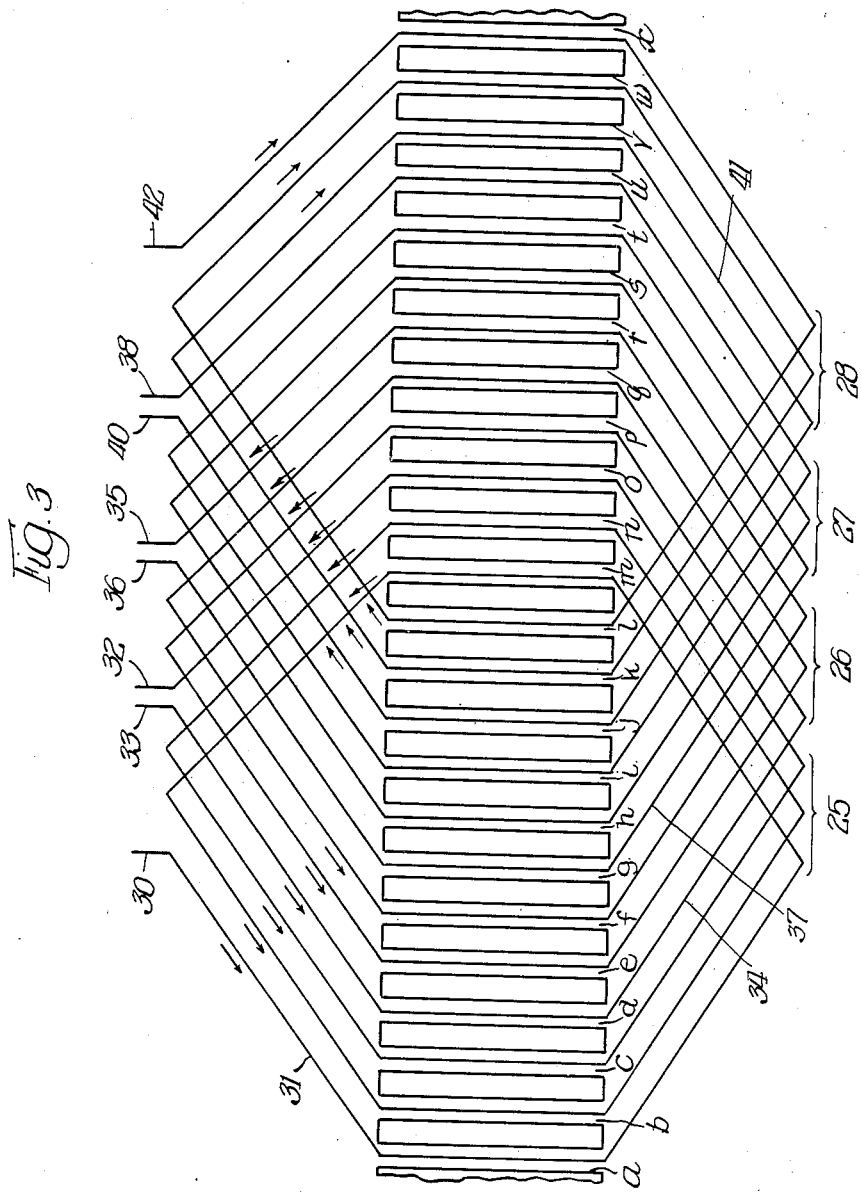

June 7, 1949.　　　F. P. WEISS　　　2,472,134
DIRECT CURRENT APPARATUS
Filed Aug. 24, 1946　　　　　　　　　　　　　8 Sheets-Sheet 4
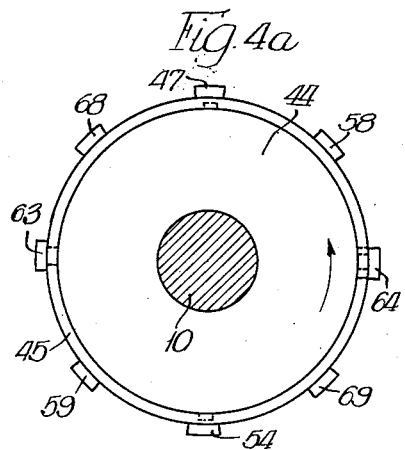
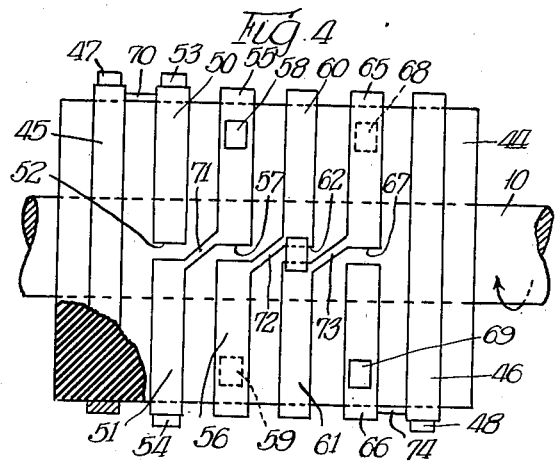
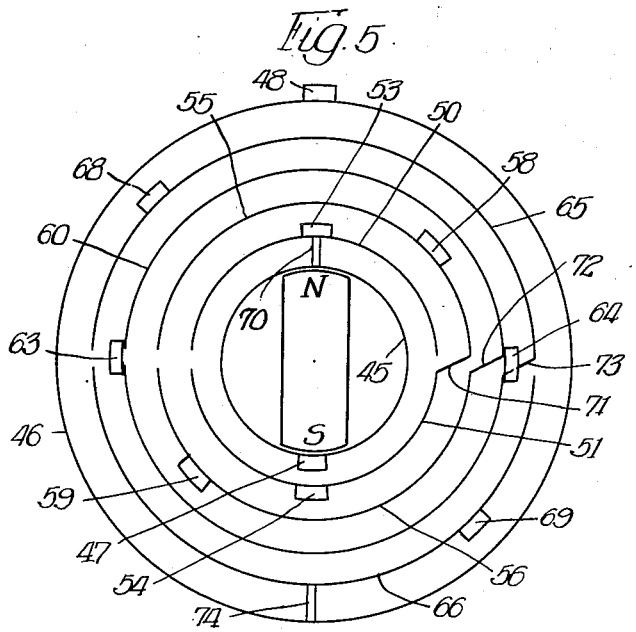
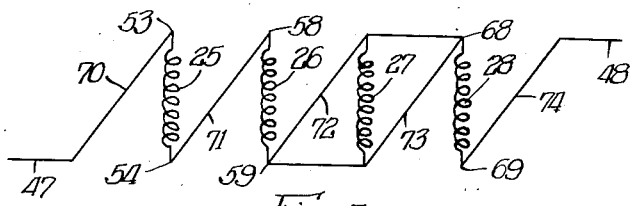
INVENTOR.
Francis P. Weiss, June 7, 1949.  F. P. WEISS  2,472,134
DIRECT CURRENT APPARATUS
Filed Aug. 24, 1946  8 Sheets-Sheet 5
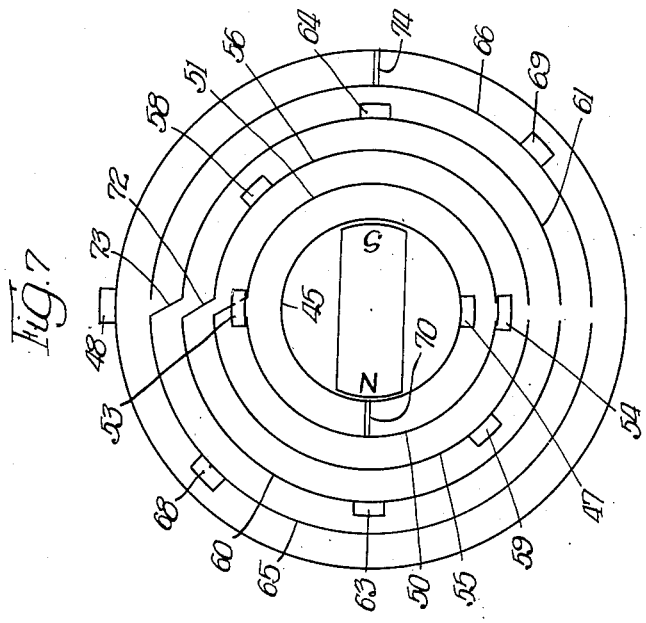
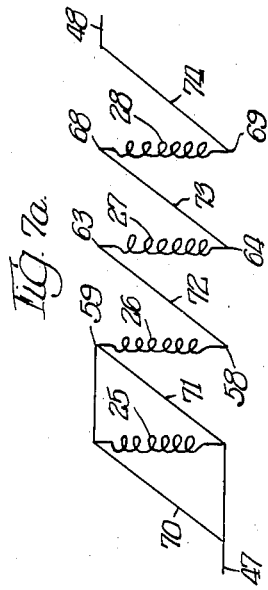
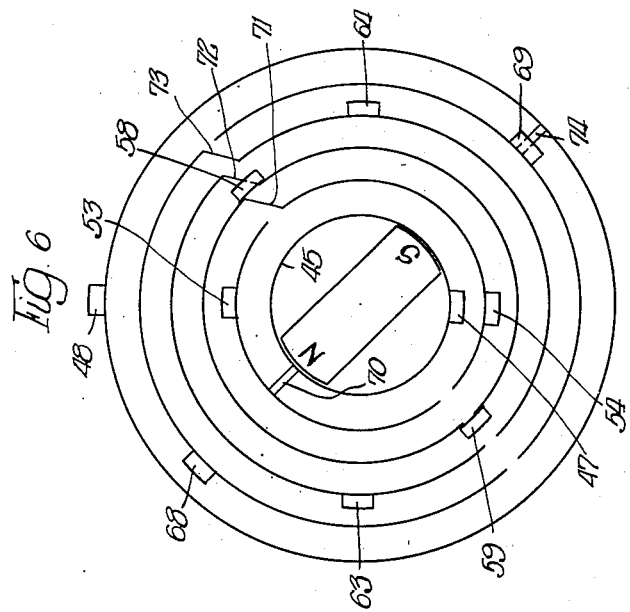
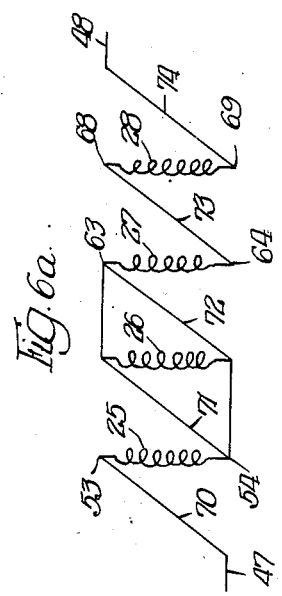
INVENTOR.
Francis P Weiss,
BY June 7, 1949.  F. P. WEISS  2,472,134
DIRECT CURRENT APPARATUS
Filed Aug. 24, 1946  8 Sheets-Sheet 6
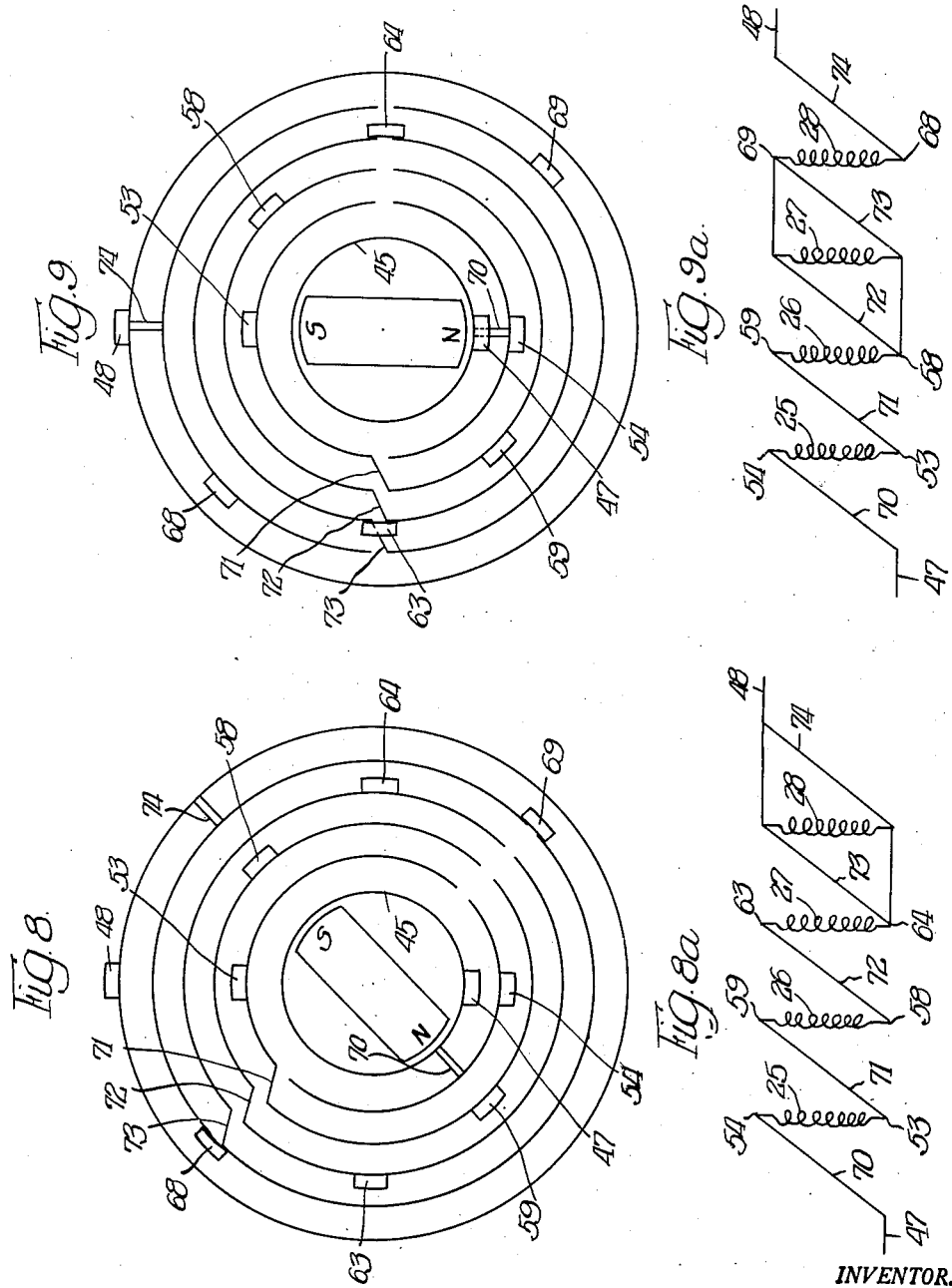
INVENTOR.
Francis P. Weiss,
BY

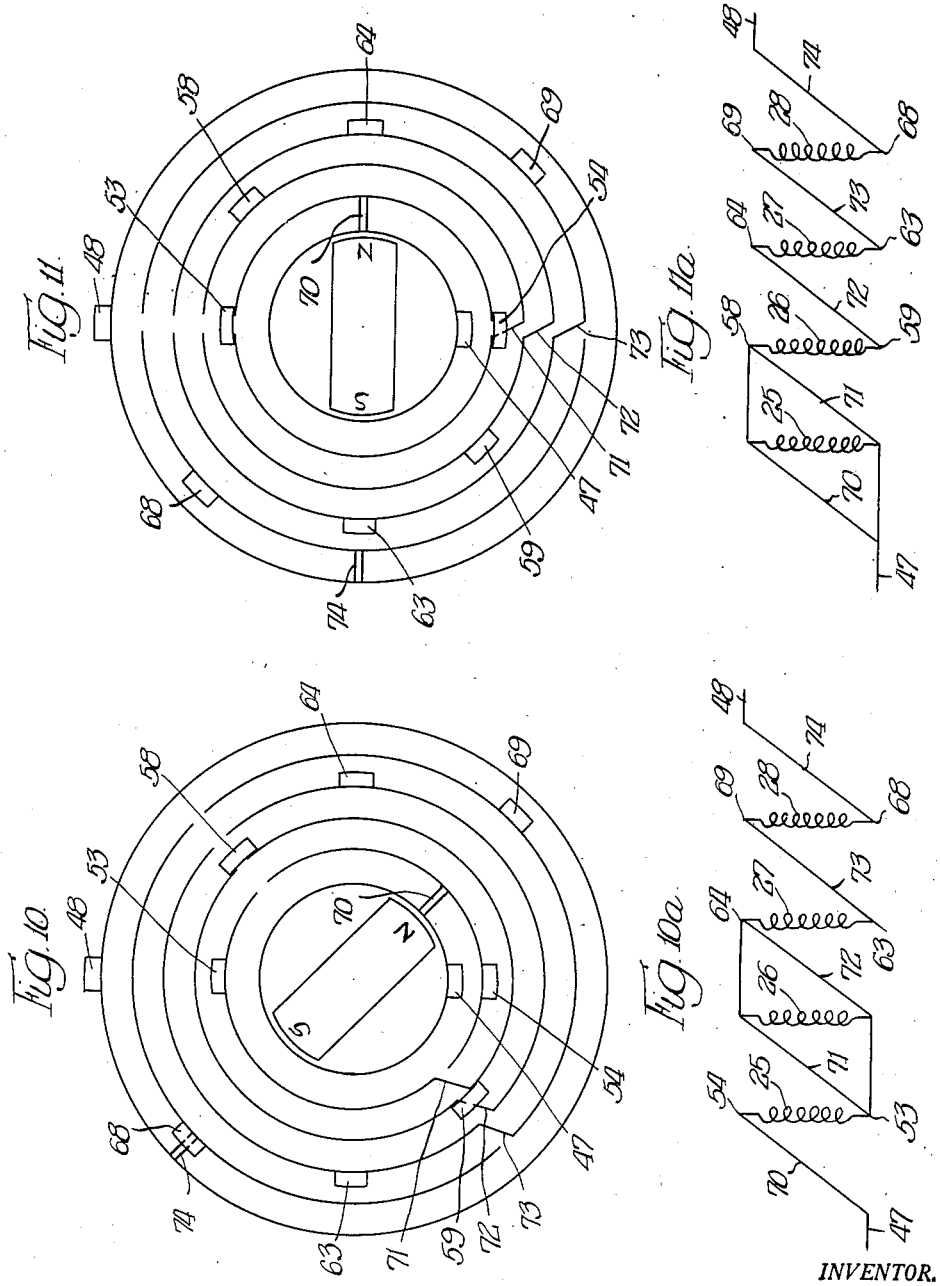

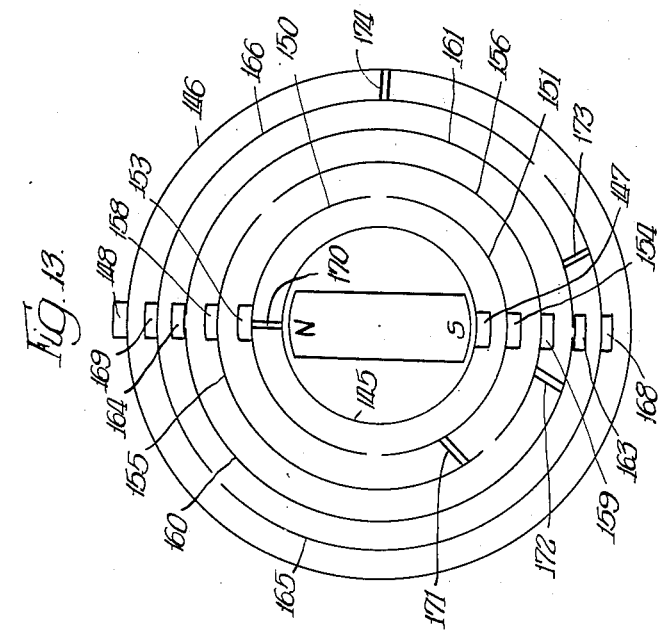
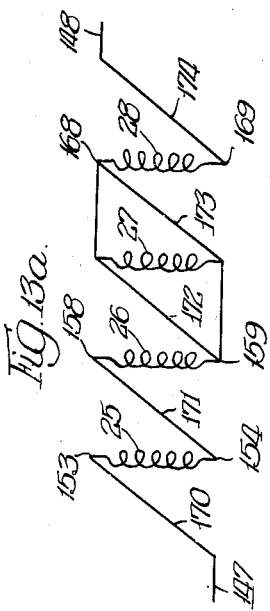
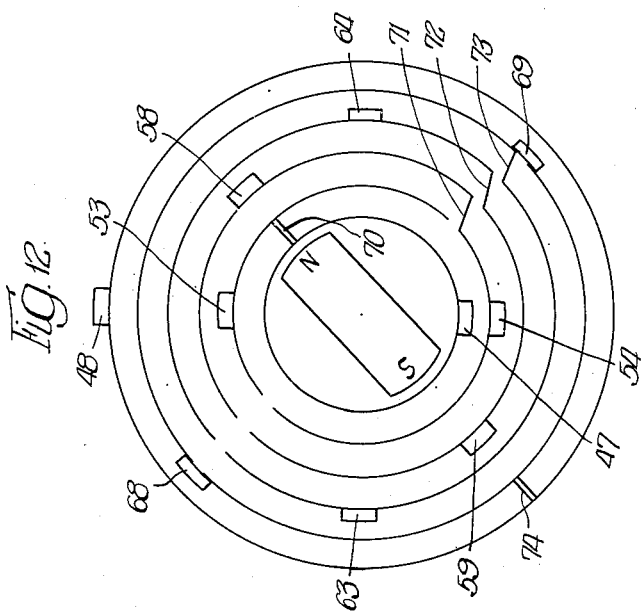
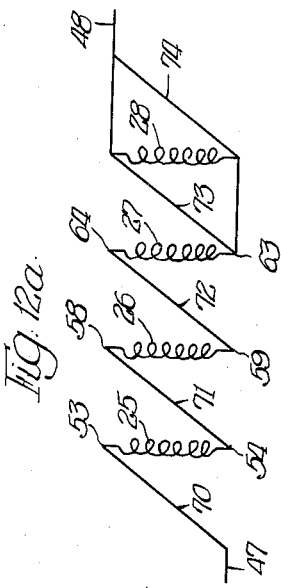

Patented June 7, 1949

2,472,134

UNITED STATES PATENT OFFICE 2,472,134

DIRECT-CURRENT APPARATUS

Francis P. Weiss, Gary, Ind.

Application August 24, 1946, Serial No. 692,889

13 Claims. (Cl. 171—322)

The invention relates to improvements in direct current apparatus and has reference more particularly to a novel design of collector-ring structure capable of improved operation in connection with high tension direct current mechanism.

The collector-ring structure of the invention may be employed as the commutating element of mechanism for generating direct current or as part of apparatus acting as a motor and employing direct current as its source of power. In the former case the generating mechanism is driven by suitable mechanical means and the mechanical energy is transformed into electrical energy. In the case of the motor electrical energy is transformed into mechanical energy. For purposes of explanation the present structure will be described in connection with current generating mechanism.

An object of the invention resides in the provision of novel collector-ring structure for rectifying the current generated in apparatus employing either a stationary or a rotating armature. Since electromagnetic induction is due to the relative motion of conductor and magnetic field every electromagnetic device is thus reversible with regard to stationary and rotating elements. When a stationary armature is employed the field magnets rotate and when the armature rotates the field magnets are provided by the stationary stator. The armature in either case, according to the invention, comprises a plurality of coil groups, the respective terminals of each coil group having electrical connection with certain elements of the collector-ring structure and which elements have relative rotation, certain elements remaining stationary, whereas, other elements rotate with the rotor.

A further object of the invention resides in the provision of collector-ring structure for current generating coil groups as described, and wherein said coil groups are of the open circuit type with the circuits through the coils being closed by the collector-ring structure in such a manner that certain coil groups are electrically connected in succession to form a series circuit arrangement providing unidirectional current paths so that the current flow in the various coil groups is in the same direction to augment each other and to constitute a continuous flow of direct current. Also during operation the collector ring structure functions in a manner to automatically short circuit each coil group in turn at the instant the coil group is undergoing reversal in the electromotive forces induced in the coil and when its potential is substantially zero.

Another object of the invention is to provide improved collector-ring structure essentially comprising pairs of circumferentially aligned, arcuate segments and wherein said pairs are spaced longitudinally of the rotating shaft of the current generating mechanism. When the armature of the present apparatus remains stationary and the exciting coils or field magnets rotate, the collector-ring structure is supplemented by circular rings located at the respective ends of the structure. However, in all cases the rings and various segments are constantly active and they perform a rectifying function to produce a continuous direct current.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 3 is a diagrammatic view illustrating the manner of winding the stationary armature shown in Figure 2;

Figure 4 is an elevational view with parts broken away showing one form of collector ring structure coming within the invention;

Figure 4a is an end view of the collector ring structure shown in Figure 4 looking from the right hand end toward the left;

Figure 5 is a diagrammatic illustration of the current collecting rings of the structure of Figure 4 showing the location of the brushes as used in conjunction with the stator winding of Figures 2 and 3;

Figure 5a is a schematic wiring diagram illustrating the flow of current through the various coil groups at the instant the field magnets assume the rotative position as shown in Figure 5;

Figure 6 is a diagrammatic illustration similar to Figure 5 but showing the current collecting rings and field magnets of the rotor in a 45 degree rotated position;

Figure 6a is a schematic wiring diagram showing the flow of current through the various coil groups for the rotated position of the field magnets as shown in Figure 6;

Figure 7 is a diagrammatic illustration similar to Figure 5 but showing the current collecting rings and field magnets of the rotor in a 90 degree rotated position;

Figure 7a is a schematic wiring diagram showing the flow of current through the various coil groups for the rotated position of the field magnets as shown in Figure 7;

Figure 8 is a diagrammatic illustration similar to Figure 5 but showing the current collecting rings and field magnets of the rotor in a 135 degree rotated position;

Figure 8a is a schematic wiring diagram showing the flow of current through the various coil groups for the rotated position of the field magnets as shown in Figure 8;

Figure 9 is a diagrammatic illustration similar to Figure 5 but showing the current collecting rings and field magnets of the rotor in a 180 degree rotated position;

Figure 9a is a schematic wiring diagram showing the flow of current through the various coil groups for the rotated position of the field magnets as shown in Figure 9;

Figure 10 is a diagrammatic illustration similar to Figure 5 but showing the current collecting rings and field magnets of the rotor in a 225 degree rotated position;

Figure 10a is a schematic wiring diagram showing the flow of current through the various coil groups for the rotated position of the field magnets as shown in Figure 10;

Figure 11 is a diagrammatic illustration similar to Figure 5 but showing the current collecting rings and field magnets of the rotor in a 270 degree rotated position;

Figure 11a is a schematic wiring diagram showing the flow of current through the various coil groups for the rotated position of the field magnets as shown in Figure 11;

Figure 12 is a diagrammatic illustration similar to Figure 5 but showing the current collecting rings and field magnets of the rotor in a 315 degree rotated position;

Figure 12a is a schematic wiring diagram showing the flow of current through the various coil groups for the rotated position of the field magnets as shown in Figure 12;

Figure 13 is a diagrammatic view illustrating the current collecting rings of a modified form of collector-ring structure coming within the invention, with the various brushes being shown in their aligned position as required by this modified form;

Figure 13a is a schematic wiring diagram showing the flow of current through the various coil groups at the instant the field magnets assume the rotative position as shown in Figure 13.

Figure 1:
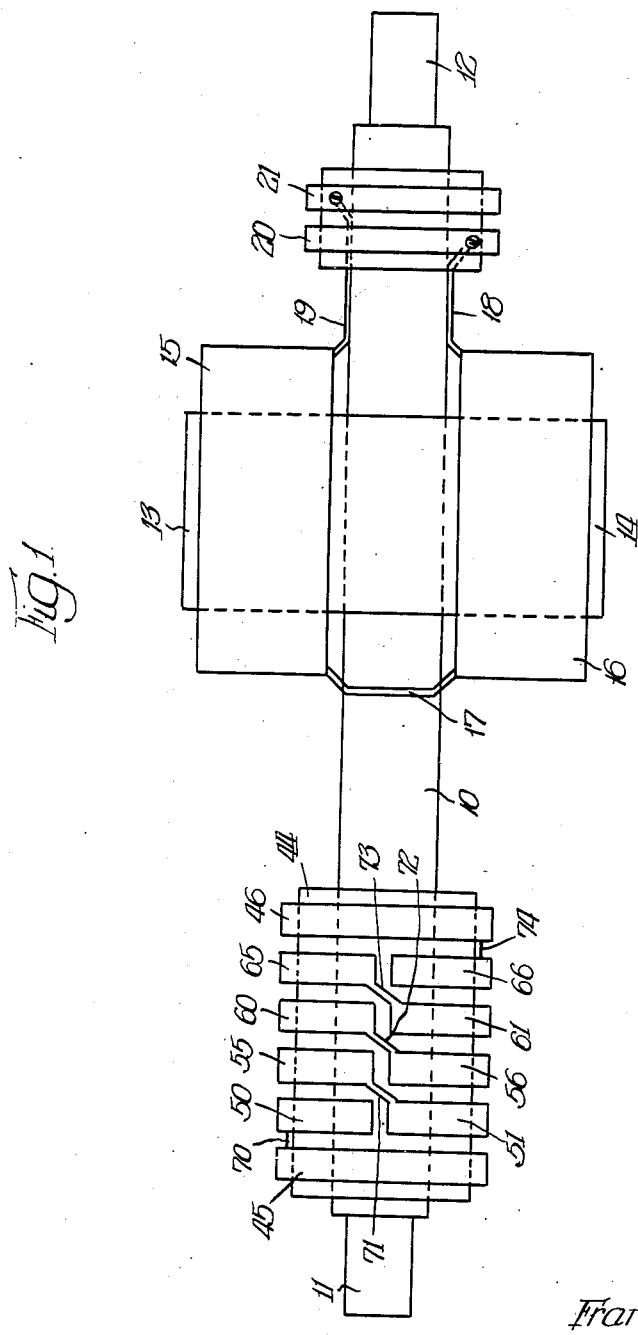
Figure 1 is a view in plan of the rotating element of the current generating machine, said element including two exciting field magnets mounted on a rotatable shaft, slip rings for the exciting current, and collector-ring structure embodying features of the present invention.
Figure 2:
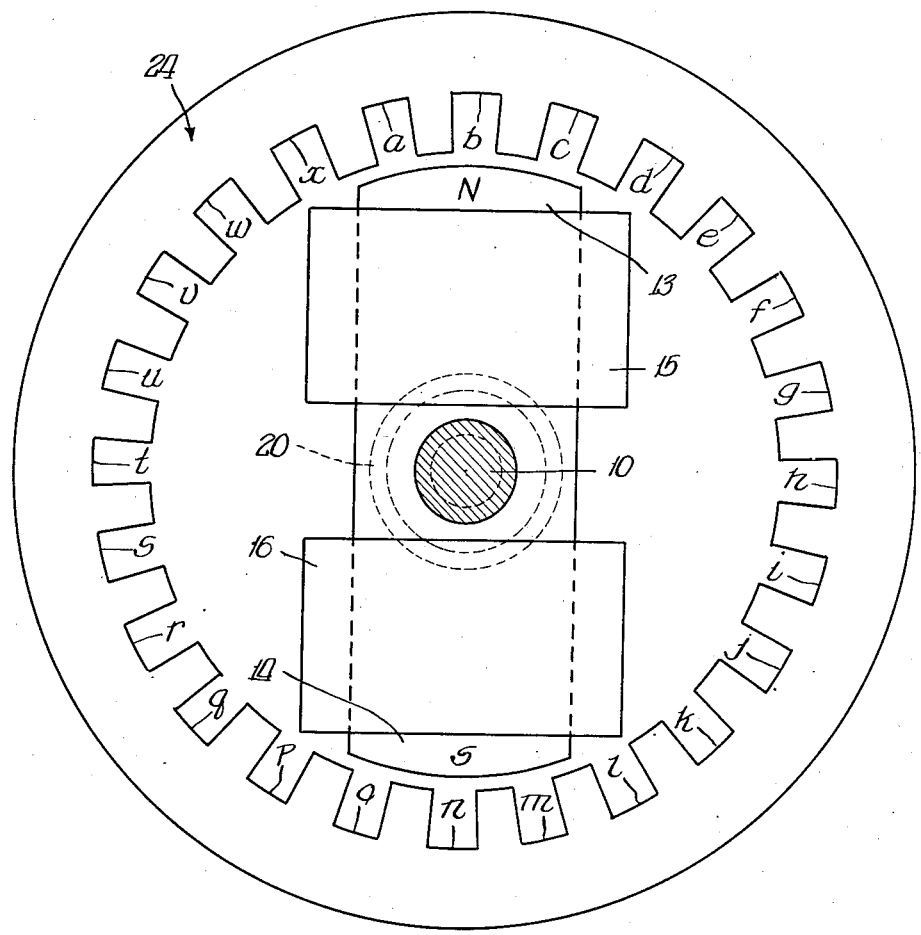
Figure 2 is a sectional view showing the rotating element of Figure 1 in associated relation with a stationary armature forming the stator of the generating machine selected for illustrating the invention.

Referring to the drawings and particularly the form of the invention shown in Figures 1, 2 and 3, the numeral 10 indicates the main shaft of the current generating mechanism and which is suitably mounted for rotation in the frame of said mechanism, and as is well understood in connection with devices of this nature, the reduced portions 11 and 12 being provided at the respective ends of said shaft by means of which the shaft is suitably journalled. In this form of the invention the shaft carries the field magnets indicated by numerals 13 and 14, the said magnets having exciting coils 15 and 16 associated therewith, and which coils are electrically connected by the conductor 17. Other conductors 18 and 19 lead from the coils respectively and the same are electrically connected to slip rings 20 and 21. Said rings have brushes associated therewith and which electrically connect with a source of electricity whereby an exciting current is supplied by means of the slip rings to the said coils 15 and 16 during rotation of shaft 10.

The stator for the current generating mechanism selected for illustrating this form of the invention is shown in Figure 2, the same being indicated by numeral 24. The stator is disposed in surrounding relation with the field magnets 13, 14 and their associated exciting coils 15 and 16, as shown in said figure. The interior surface of the stator is provided with a plurality of armature slots for receiving conductors, certain of which are electrically connected to form coil groups. Said armature slots are indicated by letters a, b, c, etc., and continuing through x, there being twenty-four slots in all and which in the illustrated embodiment are wound so as to form coil groups 25, 26, 27 and 28, as disclosed in Figure 3. Terminal 30 is electrically connected to conductor 31 which extends through slot a, returns through slot m, enters slot b, returns through slot n, enters slot c, and returns through slot o to complete the coil groups 25 at terminal 32. The next coil group 26 starts with terminal 33 and includes conductor 34 which enters slot d, returns through slot p, and enters slot e to return through slot q, enters slot f, and returns through slot r, to complete the coil group at terminal 35. The third group, namely, 27, starts at terminal 36 and includes the conductor 37, the same entering slot g, returning through slot s, then enters slot h, returns through slot t, enters slot i and returns through slot u, to complete the coil group at the terminal 38. The last coil group, namely, 28, starts at terminal 40, and includes conductor 41 which enters slot j, returning through slot v, enters slot k, returns through slot w, then enters slot l and finally returns through slot x to complete the coil group at terminal 42.

The foregoing is representative of one type of winding for the stationary armature employed in the form of the invention as shown in Figures 1, 2 and 3, it being understood, however, that the showing of three coils in one coil group within a pole pitch is simply an example since the number of coils in any coil group and also the number of coil groups may be varied within limits, depending on the particular design of the current generating mechanism. It is preferable to employ at least a sufficient number to produce a substantially continuous current during operation of the mechanism. The coil groups are connected in a predetermined series relationship in accordance with the invention by the collector-ring structure which will now be described.

Referring to Figures 4 and 4a, the collector-ring structure is suitably mounted on the main or rotor shaft 10 of the current generating mechanism by means of the cylindrical member 44 formed of any suitable insulating material so that the collector rings and segments are insulated from shaft 10 and from each other. The collector rings are disposed in rows longitudinally of the shaft, and, as clearly shown in said figure, the end collector rings 45 and 46 are circular in extent, forming a complete ring circumferentially of member 44. Ring 45 is provided with a current conducting brush 47, whereas, ring 46 is provided with a current conducting brush 48. Four split connector rings are located between the circular end rings 45 and 46 and as a result of the split construction of said rings the same provide semi-circular segments. In this form of the invention the various segments comprising the four rings are disposed on member 44 so that their gaps are in longitudinal alignment. Segments 50 and 51 are in circumferential alignment, being disposed adjacent but in spaced relation with the circular ring 45. The numeral 52 indicates the gaps in the continuous ring whereby said segments are formed. A brush 53 is in contact with segment 50, whereas, brush 54 has contact with segment 51. The adjacent segments 55 and 56 are similar to those previously described, the same having a gap 57. Brush 58 is in contact with segment 55 and a similar brush 59 is in contact with segment 56. Segments 60 and 61 are located on member 44 adjacent and to the right of the segments just described, the same being formed by the gaps 62. Brushes 63 and 64 have electrical contact with said segments, said brushes bridging the gaps 62 as clearly shown in Figures 4 and 4a. The last pair of segments is indicated by numerals 65 and 66, the same being formed by the gap 67. Brush 68 is in contact with segment 65, whereas, brush 69 is in contact with segment 66.

The connection between the brushes of adjacent groups is provided by connecting bars, the connecting bar 70 joining the circular ring 45 with segment 50. The connecting bar 71 functions to electrically connect segment 51 with segment 55. In a similar manner connecting bar 72 connects segment 56 with segment 60 and connecting bar 73 electrically joins segment 61 with segment 65. The last connecting bar is indicated by numeral 74 and said bar electrically connects segment 66 with the annular ring 46. If no interpoles are used, then connecting bar 74 is necessary to maintain circuit continuity. If interpoles are used, then connecting bar 74 is not necessary since the circuit is then completed through the interpoles.

The number of collector ring segments provided on the insulating member 44 to constitute the collector-ring structure may vary, depending on the functions to be performed and the number of coil groups in the stationary stator. The function of the end rings 45 and 46 is to maintain continuous current polarity at all times. The intermediate rings are split to form segments as described, each segment having a semi-circular form and the two segments of each intermediate ring corresponding to the number of poles provided by the field magnets. The function of the segments is to rectify the generated current and to maintain a series circuit in combination with the connecting bars as regards certain of the coil groups in the stator.

In Figures 5 to 12 inclusive the collector rings and segments have been schematically illustrated with ring 45 being located on the inside and ring 46 being located on the exterior. In Figure 5 the various segments are positioned as shown in Figure 4 with their respective gaps being disposed in horizontal alignment. The remaining figures show various rotative positions of the ring structure for a complete revolution. The brushes are stationary, being supported in contact with their rings and segments by any suitable means which may comprise part of the stator. Along with the brushes the various coils 25, 26, 27, 28, as shown in Figure 3, are likewise stationary. The rotor constitutes the rotating element of the current generating mechanism and said rotor carries the exciting magnets having north and south polarity as shown. The rings and segments are fixed to the rotor and they rotate in unison with the field magnets. For any particular rotative position of the rotor the collector-ring segments will have contact with certain brushes and the various armature coils having electrical connection with the brushes in a manner as will be presently described are electrically connected to form a series circuit with a predetermined coil group, however, being short circuited in certain rotative positions so that the electromotive forces induced in the various coils will properly augment each other to constitute a continuous direct current.

In accordance with the illustrated embodiment it will be understood that coil 25, which occupies the slots a, b, c—m, n, o, has electrical connection to brushes 53 and 54. Terminal 30 of this coil is connected to brush 53, whereas terminal 32 is connected to brush 54. For coil 26 terminal 33 is electrically connected to brush 58, whereas terminal 35 is electrically connected to brush 59. For coil 27 terminal 36 is electrically connected to brush 63 and terminal 38 to brush 64. For coil 28 terminal 40 is electrically connected to brush 68 and terminal 42 is electrically connected to brush 69.

Figure 5a is a schematic wiring diagram illustrating the flow of current through the various coil groups at the instant the field magnets assume a rotative position, as shown in Figures 2 and 5. The field magnets are located in a vertical position and accordingly it will be understood that coil 27, occupying armature slots g, h, i—s, t, u, is required to be shorted since the induced electromotive force in this coil is at zero potential. Also it will be understood that a reversal in current flow in coil 27 resulting from induced electromotive forces is about to take place (compare Figure 6a with Figure 10a). This short circuiting of coil 27 is effected by the brushes 63 and 64 as will be evident from Figure 5. Tracing the circuit from brush 47, the same will include the connecting bar 70, brush 53, and since this brush has electrical connection with terminal 30 of coil 25 the said coil is placed in circuit, the same terminating with brush 54. This brush is in contact with segment 51 which includes the connecting bar 71 connecting with segment 55 and thus brush 58. Brush 58 is electrically connected to terminal 33 and thus coil 26 is placed in circuit, the same terminating with brush 59. The next coil 27 is shorted and this is indicated in the schematic wiring diagram of Figure 5a. Brush 59, by reason of connecting bar 72, the short circuiting brushes 63, 64 and connecting bar 73, has electrical connection with brush 68. Said brush is connected to terminal 40 and thus coil 28 is included in the series circuit the same terminating with brush 69 which has electrical connection by the connecting bar 74 with ring 46 and brush 48. The two ends of the power circuit are thus indicated by brushes 47 and 48 and which circuit includes in a series circuit arrangement the coils 25, 26 and 28. It will also be observed that the coils are so connected that their induced electromotive forces augment each other, with the result that the current flow through the series circuit arrangement produces a continuous direct current.

In Figure 6 the rotor has revolved in a counterclockwise direction an angular distance of 45 degrees. The collector rings and segments have also revolved therewith and as a result the segments are brought into contact with different brushes. For this rotative position of the rotor the coil 26 is short circuited since the induced electromotive force in this coil is at zero potential and a reversal in direction of current flow will take place as rotation continues. Beginning with brush 47, the circuit includes the connecting bar 70 and the brush 53. The coil 25 has electrical connection at one terminal with brush 53 and at its opposite terminal with brush 54. The next coil group is shorted by the connecting bar 71, the brushes 58, 59 and connecting bar 72. As a result brush 54 is electrically connected to brush 63 and coil 27 is thus included in the series circuit, the same terminating at brush 64 which is electrically connected by connecting bar 73 to brush 68. This latter brush forms one terminal of coil 28 which terminates with brush 69 and through connecting bar 74 the circuit terminates with brush 48.

In Figure 7 the rotor has revolved 90 degrees in a counterclockwise direction from its position as shown in Figure 5. The collector-ring structure has short circuited coil 25 which in this position of the rotor is at zero potential. The circuit from brush 47 to brush 48 can be clearly traced by following the schematic wiring diagram of Figure 7a wherein it will be seen that coils 26, 27 and 28 are connected in a series circuit relation whereby the current flowing in these coil groups as a result of the electromotive forces induced therein augment each other and produce a continuous flow of direct current.

In Figure 8 the rotor has revolved 135 degrees from its position as shown in Figure 5 and the next coil group, namely, 28, is now shorted by the collector-ring structure including brushes 68 and 69. It will be observed by reference to Figure 8a that coil 25 and coil 26 are oppositely connected by the brushes as compared to the connections shown in Figure 5a. This is due to the fact that the armature conductors provided by these coil groups are under the influence of the field magnet having south polarity, whereas, with the rotor in substantially the vertical position as shown in Figure 5, the armature conductors of said coil groups are under the influence of the field magnet having north polarity. The collector ring structure of the invention provides for this automatic connecting of the various brushes constituting the terminals of the various coil groups, with the result that the current flow in the various coil groups is in the same direction to augment each other and constitute a continuous flow of direct current. The collector-ring structure also automatically short circuits a predetermined coil group coinciding with the zero potential and reversal of the induced E. M. F.'s in said coil group.

Figures 9, 10, 11 and 12 disclose other rotative positions of the rotor and which are the reverse of those shown respectively in Figures 5, 6, 7 and 8. In other words, the south pole of the field magnets has assumed the rotative position formerly occupied by the north pole. In the schematic wiring diagrams, Figures 9a to 12a inclusive, certain coil groups are shorted as before but the remaining coil groups are reversely connected as compared to the connections of Figures 5a to 8a inclusive, respectively.

Figure 13 schematically illustrates a modified form of collector-ring structure coming within the invention wherein the segments are disposed in 45 degree rotative positions with respect to each other instead of the brushes as in the modification just described. The brushes are located in top and bottom rows parallel to the rotor shaft and thus the two rows of brushes are 180 degrees apart.

In Figure 13 it will be seen that the segments 150 and 151 are positioned as in Figure 5, reference being made to their analogous segments 50 and 51. In this modification, however, the adjacent segments 155 and 156 are displaced an angular distance of 45 degrees so that the gaps in these two segments do not align with the gaps in the first mentioned segments. In a similar manner the next adjacent segments 160 and 161 are displaced an angular distance of 45 degrees and it will be seen that their gaps are vertically positioned, with the result that these segments are electrically connected by the brushes 163 and 164. The next pair of segments, namely, 165 and 166, are displaced an additional 45 degrees with segment 166 having connection by means of the connecting bar 174 to the outer ring 146. Other connecting bars 170, 171, 172 and 173 are employed, the same being located as shown in Figure 13, and which function to connect certain segments in the same manner as connecting bars 70, 71, 72 and 73.

Figure 13a is a schematic wiring diagram illustrating the flow of current through the various coil groups, namely, 25, 26, 27 and 28, at the instant the field magnets assume a rotative position, as shown in Figure 13. The coil groups are carried by the stator as previously described and their terminals have connection to the brushes, with the coil 25 being connected to brushes 153 and 154, coil 26 to brushes 158 and 159; coil 27 to brushes 163 and 164, and coil 28 to brushes 168 and 169. It will be understood that the brushes remain stationary and that the field magnets and the collector-ring structure rotate with the rotor shaft of the current generating apparatus. In operation the modified structure of Figure 13 is similar to that heretofore described, as will be clearly evident by comparing Figure 5a with Figure 13a, the same coil group, namely, 27, being shorted and the remaining coil groups having a series circuit arrangement to produce a continuous direct current.

The direct current machine as disclosed in the drawings is similar in general construction to a polyphase alternating current generator or synchronous motor with the coils, however, comprising open circuit groups of coils. The various coils are electrically connected to each other in a predetermined manner through the collector-ring structure and which is constructed and arranged with segments in combination with connecting bars by means of which certain segments are joined. As a result of the rotation of the collector-ring structure, certain coil groups are electrically connected to form a series circuit arrangement, thus producing a single current path. Also during operation the collector-ring structure functions to automatically short circuit the respective coil groups at the instant the potential of a particular coil group is subsantially zero and which coil group is then undergoing reversal in E. M. F.

A desirable feature of the present direct current apparatus resides in the fact that the coil groups providing the armature conductors are stationary, being supported by the stator, and accordingly, adequate insulation may be provided to insure operation under high potentials. Also the various parts of the apparatus are relatively simple in construction and are readily accessible so as to enable repairs to be made easily and quickly. The collector-ring structure functions in an improved and novel manner to rectify the alternating current produced in the various coil groups by electrically connecting said coils so as to form a single current producing path.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In direct current apparatus, a plurality of armature conductors provided by a number of open circuit and independent coil groups, a plurality of field pieces each including a core member having a winding and at least one pole face disposed adjacent the armature conductors, a rotor shaft journalled for rotation whereby relative movement is provided for between said armature conductors and the field pieces, a collector-ring assembly carried by said rotor shaft and adapted to rotate therewith, and brushes forming terminals for said coil groups and which coact with the collector-ring assembly to maintain the coil groups in a series circuit relation during rotation of the rotor shaft to comprise a single current path.

2. In direct current apparatus, a plurality of open circuit and independent coil groups providing armature conductors, a plurality of field pieces each including a core member having a winding and at least one pole face disposed adjacent the armature conductors, means providing for relative movement between said armature conductors and the field pieces including a rotor shaft journalled for rotation, a collector-ring assembly carried by said rotor shaft and adapted to rotate therewith, said collector-ring assembly including segments certain of which are electrically connected, and brushes adapted to contact the segments respectively, said brushes forming terminals for said coil groups and which coact with the segments to maintain the coil groups in a series relation during rotation of the rotor shaft to comprise a single current path.

3. In direct current apparatus, an armature including a plurality of open-circuit coil groups, a rotor including a shaft journalled for rotation, collector-ring structure carried by the rotor shaft and including a plurality of collector-ring segments, a plurality of brushes positioned in contact with the segments respectively, certain segments having electrical connection with a segment adjacent thereto in a direction circumferentially of the rotor shaft, and the terminals of said coil groups having electrical connection with said brushes respectively.

4. In direct current apparatus, an armature including a plurality of open-circuit coil groups, a rotor including a shaft journalled for rotation, collector-ring structure carried by the rotor shaft and including a plurality of collector-ring segments arranged in circumferential rows positioned in spaced relation longitudinally of the rotor shaft, a plurality of brushes positioned in contact with the segments, respectively, whereby relative rotation is permitted between the segments and brushes, means electrically connecting certain segments with a segment adjacent thereto longitudinally of the rotor shaft, and the terminals of said coil groups having electrical connection with said brushes respectively.

5. In direct current apparatus, an armature including a plurality of open-circuit coil groups, a rotor including a shaft journalled for rotation, collector-ring structure carried by the shaft and insulated therefrom including a plurality of collector-ring segments, said segments being arranged in circumferential rows longitudinally of the rotor shaft, a plurality of stationary brushes positioned in contact with the segments, respectively, whereby relative rotation is permitted between the segments and brushes, means electrically connecting certain segments in different rows to form pairs of segments, and the terminals of said coil groups being electrically connected by said brushes to said collector-ring structure whereby the coil groups are constantly connected in a series circuit during rotation of the rotor shaft to comprise a single current path.

6. In direct current apparatus, in combination, a stator having a plurality of open-circuit coil groups wound thereon and which provide armature conductors, a rotor including a shaft journalled for rotation, field magnets carried by said rotor shaft and rotatable therewith for inducing alternating electromotive forces in said coil groups, collector-ring structure carried by said rotor shaft and including a plurality of arcuate segments insulated from each other and circumferentially disposed in rows, means electrically connecting a segment in each row with a certain segment in another row, and brushes in contact with the segments respectively, said segments and brushes being arranged and having electrical connection with the terminals of the coil groups whereby upon rotation of the collector-ring structure predetermined coil groups are electrically connected in a manner to rectify said alternating electromotive forces and form a single current producing path, each said coil group being short circuited at the instant of zero potential in the coil group.

7. In direct current apparatus, in combination, a stator having a plurality of open-circuit coil groups wound thereon and which provide armature conductors, a rotor including a shaft journalled for rotation, field magnets carried by said rotor shaft and rotatable therewith for inducing alternating electromotive forces in said coil groups, collector-ring structure carried by said rotor shaft and including a plurality of arcuate segments insulated from each other and circumferentially disposed in rows with the rows being spaced longitudinally of the shaft, means electrically connecting a segment in each row with a certain segment in another row, and brushes in contact with the segments respectively, said coil groups having their terminals electrically connected to the brushes respectively, and said segments and brushes being arranged relative to each other whereby upon rotation of the collector-ring structure predetermined coil groups are electrically connected in a manner to rectify said alternating electromotive forces and form a single current producing path, said coil groups being successively short circuited at the instant of zero potential in the coil group and when the same is undergoing reversal in E. M. F.

8. In direct current apparatus, in combination, open-circuit coil groups providing alternating electromotive forces, a rotor shaft journalled for rotation, collector-ring structure carried by the rotor shaft and rotatable therewith, said collector-ring structure including insulated segments disposed in rows, each row including a plurality of segments and which are circumferentially spaced to form gaps with adjacent segments, means electrically connecting at least one segment of each row with a certain segment of another row, brushes forming terminals for the coil groups respectively, and at least one brush in engagement and electrically connecting with each segment, a collector ring positioned on the collector-ring structure in spaced and insulated relation with respect to the adjacent row of segments, and means electrically connecting each collector ring with a certain segment in one of said rows of segments.

9. In direct current apparatus, in combination, open-circuit coil groups providing alternating electromotive forces, a rotor shaft journalled for rotation, collector-ring structure carried by the rotor shaft and rotatable therewith, said collector-ring structure including insulated segments disposed in rows longitudinally of the rotor shaft, each row including a plurality of segments and which are circumferentially spaced to form gaps with adjacent segments, means electrically connecting at least one segment of each row with a certain segment of another row, brushes forming terminals for the coil groups respectively, and at least one brush in engagement and electrically connecting with each segment, an annular collector ring positioned at each end of the collector-ring structure in spaced and insulated relation with respect to the adjacent row of segments, means electrically connecting each said collector ring with a certain segment in the row adjacent thereto, and a brush in contact with each annular collector ring.

10. In direct current apparatus, in combination, open-circuit coil groups providing alternating electromotive forces, a rotor shaft journalled for rotation, collector-ring structure carried by the rotor shaft and including insulated segments disposed in rows longitudinally of the rotor shaft, each row including a plurality of segments circumferentially disposed to form gaps with the gaps in the various rows being in alignment and substantially parallel with the shaft, connecting bars electrically joining at least one segment of each row with a certain segment of another row, brushes forming terminals for the coil groups respectively and at least one brush in engagement and electrically connecting with each segment, said brushes being displaced a predetermined angular distance with respect to each other, a collector ring positioned at each end of the collector-ring structure in spaced and insulated relation with respect to the adjacent row of segments, and means electrically connecting each collector ring with a certain segment in one of the rows of segments.

11. In direct current apparatus, in combination, open-circuit coil groups providing alternating electromotive forces, a rotor shaft journalled for rotation, collector-ring structure carried by the rotor shaft and including insulated segments disposed in rows longitudinally of the rotor shaft, each row including a plurality of segments circumferentially disposed to form gaps and which are angularly displaced as regards said rows to a predetermined extent, connecting bars electrically joining at least one segment of each row with a certain segment of another row, brushes forming terminals for the coil groups respectively and at least one brush in engagement and electrically connecting with each segment, said brushes being positioned in longitudinal rows substantially parallel with the shaft, a collector ring positioned at each end of the collector-ring structure in spaced and insulated relation with respect to the adjacent row of segments, and means electrically connecting each collector ring with a certain segment in one of the rows of segments.

12. In direct current apparatus, in combination, collector ring structure adapted to be rotated in synchronism with a rotor shaft, said collector ring structure including insulated segments disposed in rows, each row including a plurality of segments circumferentially spaced to form gaps with adjacent segments, means electrically connecting at least one segment of each row with a segment of another row, at least one collector ring positioned on the collector ring structure in spaced and insulated relation with respect to an adjacent row of segments, and means electrically connecting said collector ring with a certain segment in one of said rows of segments.

13. In direct current apparatus, in combination, collector ring structure adapted to be rotated in synchronism with a rotor shaft, said collector ring structure including insulated segments disposed in rows longitudinally of said structure, each row including a plurality of segments circumferentially spaced to form gaps with adjacent segments, means electrically connecting at least one segment of each row with a certain segment of an adjacent row, a collector ring positioned on the collector ring structure at each end thereof in spaced and insulated relation with respect to the adjacent row of segments, and means electrically connecting each said collector ring with a certain segment in one of said rows of segments.

FRANCIS P. WEISS.

REFERENCES CITED

The following references are of record in the file of this patent:

Ankerwicklungen and Ankerkonstruktionen, Arnold, published by Julius Springer, Berlin, 1899, pages 218 and 219.